United States Patent [19]

Nelson

[11] Patent Number: 4,466,637
[45] Date of Patent: Aug. 21, 1984

[54] POWER DRIVE MECHANISM FOR TRAILER LANDING GEAR

[76] Inventor: Carl A. Nelson, P.O. Box 371, Athena, Oreg. 97813

[21] Appl. No.: 304,616

[22] Filed: Sep. 22, 1981

[51] Int. Cl.³ .............................................. B60S 9/06
[52] U.S. Cl. .................................. 280/766.1; 254/419
[58] Field of Search ................................. 280/763–766, 280/475; 254/86 R, 419; 248/352; 74/378, 379; 464/115, 120, 162

[56] References Cited

U.S. PATENT DOCUMENTS

| | | | |
|---|---|---|---|
| 1,334,154 | 3/1920 | Harrison | 464/120 |
| 3,177,664 | 4/1965 | Konkle . | |
| 3,182,956 | 5/1965 | Dalton | 280/766 |
| 3,402,915 | 9/1968 | Dalton | 254/86 R |
| 3,784,160 | 1/1974 | Phillips . | |
| 3,861,648 | 1/1975 | Glassmeyer | 280/766 |
| 3,874,682 | 4/1975 | Dalton . | |
| 3,895,682 | 7/1975 | Graham . | |
| 4,071,147 | 1/1978 | Hornagold . | |
| 4,129,322 | 12/1978 | Kuntz, Jr. . | |
| 4,187,733 | 2/1980 | Walther et al. | 254/419 |
| 4,281,852 | 8/1981 | Konkle | 280/766 |
| 4,345,779 | 8/1982 | Busby | 280/766 |

FOREIGN PATENT DOCUMENTS 706288  3/1965  Canada ............................. 280/766

Primary Examiner—David M. Mitchell
Attorney, Agent, or Firm—Eugene M. Eckelman

[57] ABSTRACT

A drive motor is arranged to be secured to the frame of a manually operated trailer landing gear assembly, and a releasable coupling is provided for connection between the output shaft of the drive motor and an input shaft of a gear reduction assembly of the landing gear assembly whereby the manual drive is converted to power drive. The releasable coupling allows the drive motor to be disconnected from the gear reduction assembly in the event that it is desired to provide manual operation. The releasable coupling has a structure which maintains a drive connection through axial shifting movements of the gear reduction assembly input shaft.

4 Claims, 4 Drawing Figures

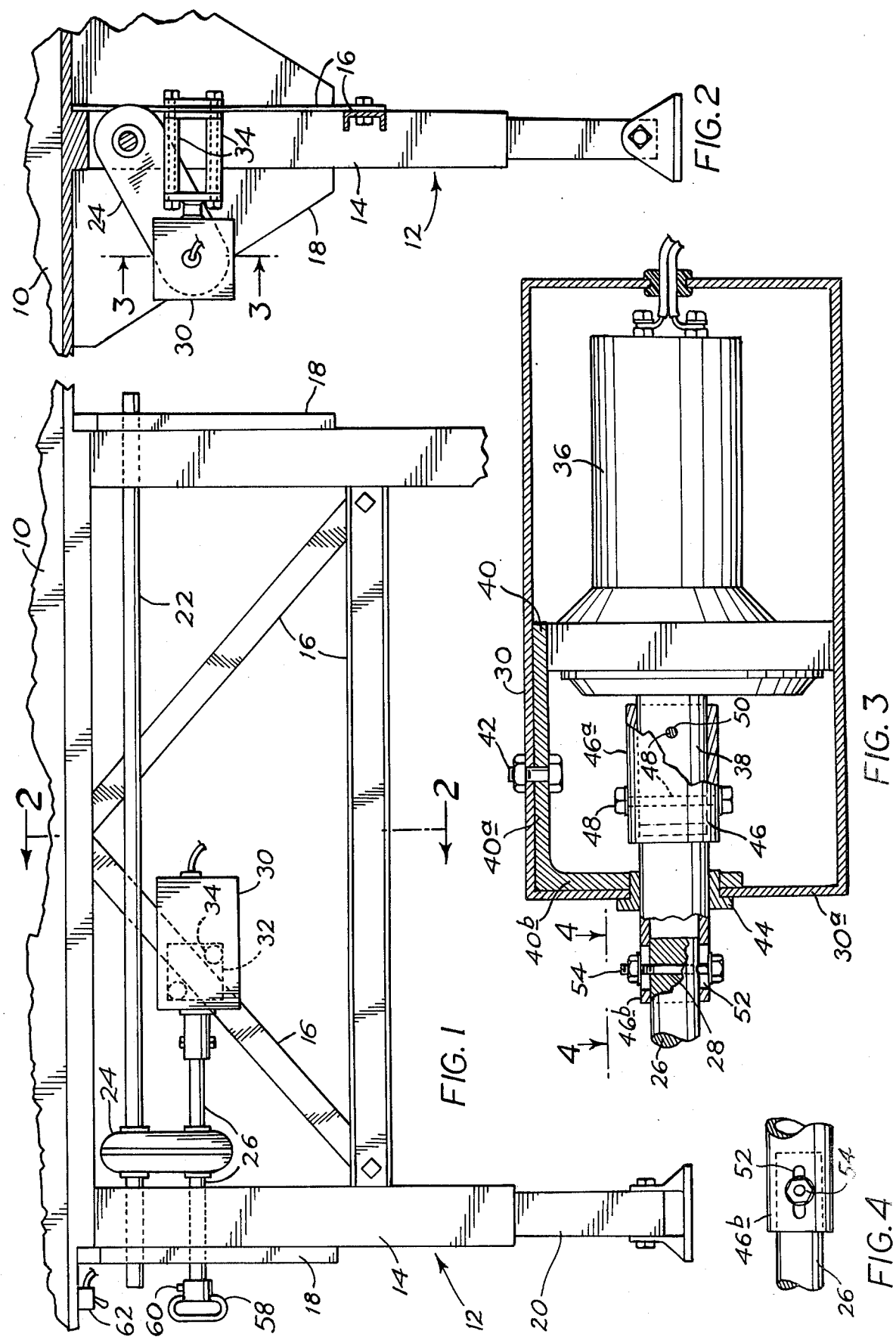

POWER DRIVE MECHANISM FOR TRAILER LANDING GEAR

BACKGROUND OF THE INVENTION

This invention relates to a new and novel power drive mechanism for trailer landing gear and also pertains to a power drive mechanism arranged to convert a hand operated mechanism to a power mechanism.

Semi-trailers or similar vehicles are provided with front landing gear arranged to support the front of the trailer on the ground for loading or unloading the trailer while the tractor vehicle is detached. These landing gears have jack-type structures so that the front of the trailer can be raised or lowered for connecting the trailer to or disconnecting it from the tractor vehicle. Most landing gears of this type employ manual means for operating the jack structure. The jack structures have a cross driven shaft, a gear reduction assembly on the driven shaft, a drive shaft projecting from the gear reduction assembly, and a crank for manually operating the drive shaft. Such manually operated jack structures are difficult to operate and require considerable time in their operation. Powered lift mechanisms having heretofore been provided for various types of landing gear or dolley assemblies but such power mechanisms have the disadvantage that the power drive thereof requires special landing gear constructions which are complex in structure and expensive to manufacture. Thus, power drives of previous power driven mechanisms are not arranged for adaptation to existing landing gear assemblies. In addition, such mechanisms do not provide the option of allowing either powered or manual operation whereby the landing gears are inoperative in the event of a failure or absence of the source of power.

SUMMARY OF THE INVENTION

According to the present invention and forming primary objectives thereof, a power drive mechanism for trailer landing gears is provided that is simplified in construction and that is readily adaptable to most existing hand driven mechanisms of trailer landing gears. Also, the power drive mechanism is readily detachable so that the landing gears can be manually operated if desired. Furthermore, the power drive mechanism is versatile as to application to either side of the trailer and also on either an inner or outer side of the landing gear.

In carrying out the invention, a drive motor, such as an electric motor, is arranged for mounting on frame members of trailer landing gear and also is arranged so that the output shaft thereof can be axially aligned and coupled to a projecting input shaft of a gear reduction assembly for a driven shaft which has a drive connection with telescoping leg portions of the landing gears. Coupling means between the motor and the input shaft of the gear reduction assembly provide ready connection of of the drive motor to the gear reduction assembly and also allow shiftable operation of the input shaft of the gear reduction assembly.

The invention will be better understood and additional objects and advantages will become apparent from the following description taken in connection with the accompanying drawings.

BRIEF DESCRIPTION OF THE DRAWINGS

FIG. 1 is a fragmentary elevational view of a landing gear assembly for trailers including the present invention;

FIG. 2 is a sectional view taken on the line 2—2 of FIG. 1;

FIG. 3 is an enlarged fragmentary sectional view taken on the line 3—3 of FIG. 2; and FIG. 4 is a fragmentary plan view taken on the line 4—4 of FIG. 3.

DETAILED DESCRIPTION OF A PREFERRED EMBODIMENT

With particular reference first to FIG. 1, the numeral 10 represents a front portion of a semi-trailer in common usage. Such trailers have a fifth wheel structure (not shown) for removable connection to a pulling vehicle or tractor (also not shown) and carry a landing gear assembly 12 adjacent their front end which is used for support of this end of the trailer when disconnected from the tractor vehicle.

FIGS. 1 and 2 show a typical landing gear assembly, comprising a pair of vertical tubular housings 14 secured together by cross frame members 16 and securely attached to the trailer by some of such cross members and also by side depending frames 18. Vertical housings 14 receive telescoping leg members 20 through their lower ends, and such leg members have a conventional drive connection with the housings 14, such as a screw connection, forming a jack-like arrangement which can extend and retract the leg members. Such jack structure is not shown in detail since various types of conventional jack structures can be employed.

A cross driven shaft 22 extends between the two housings 14 in a journalled support and has suitable drive connection with the operating jack mechanisms of the leg members 18 as in conventional structure. Rotation of the driven shaft 22 operates the jack structures in unison to raise or lower the leg members 20.

The output of a gear reduction assembly 24 of conventional construction is connected to the shaft 22 and has an input shaft 26 projecting therefrom. The shaft 26 projects from both sides of the gear reduction assembly 24 which allows such assembly to be mounted on either side of the trailer. One end of this shaft projects outwardly through the adjacent landing gear support frame 18 and normally receives a hand crank for manual operation of the driven shaft 22 through the gear reduction assembly 24. Each of the projecting ends of the shaft 26 has a diametral aperture 28, FIG. 3, adjacent the free end thereof which normally receives a crank attaching pin prior to conversion by the instant invention. Shaft 26 is shiftable axially in a change speed ratio of the gear reduction assembly.

According to the invention, a drive motor housing 30 is provided in an arrangement such that it can be mounted on a frame member 16 of the landing gear assembly adjacent the gear reduction assembly 24. For this purpose, the drive motor has a support bracket or base 32 arranged for connection to one or more cross frame members 16 of the landing gear assembly. Such connection may comprise a bolted connection 34 as shown or it may comprise any other connection such as angle irons welded between the motor housing 30 and the frame 16 of the landing gear.

Housing 30 encloses a motor 36 having an output shaft 38. Motor 36 comprises an integral part of a mounting bracket 40 having a bolted connection 42 with the housing 30. This bracket is angular in shape, having a main body portion 40a which is bolted to the housing and a partial end portion 40b which together with an end wall 30a on the housing 30 supports a bearing 44 in aperture means 45 in the portions 30a and 40b.

A sleeve-type coupler 46 provides connection between the output shaft 38 of the motor and the shaft 26 of the gear reduction assembly 24. This coupler has a first open end portion 46a dimensioned and arranged to fit on the shaft 38. End portion 46a is coupled to the shaft 38 by one or more pins 48, preferably two, disposed in spaced relation on the shaft and extending at right angles to each other. These pins are mounted in aligned apertures 50 in the two members.

The coupler 46 has a second open end portion 46b of reduced diameter and having journaled support in bearing 44. The internal diameter of sleeve portion 46b is of predetermined dimension so as to receive the shaft 26. End portion 46b includes diametrically aligned, elongated slots 52, FIGS. 3 and 4, arranged to receive a cross pin 54 which as associated with the slots secures these parts rotatably together but at the same time allows a short slidable adjustment of such parts.

In the installation of the present power drive on existing hand operated assemblies, the motor housing 30 is secured on the trailer in a selected position so as to align the projecting end 46a of the coupler 46 with the input shaft 26 of the gear reduction assembly 24 and also in selected spaced relation for proper attachment of the connector 46 with the shaft 26, namely, a proper spacing of the motor housing 30 from the input shaft 26 so as to allow shaft 26 to shift. As thusly installed, a hand operated landing gear assembly is converted to a power operated assembly.

A loop-type shiftable handle 58 can be mounted on the outer projecting end of the shaft 26 for ease of shifting the shaft. The handle is suitably apertured to receive a cross pin 60 extending through such apertures and also extending through the existing aperture 28 that previously mounted the hand crank in place.

The present structure thus provides a simplified power conversion for hand operated trailer landing gear, and in view of the motor structure and coupling means, such power drive can be readily applied to existing landing assemblies employing a gear reduction assembly with a projecting drive shaft of the type shown. The conversion to power can be accomplished in a short time and with minimum expense. In addition, the structure of the coupler 46 allows the drive attachment of the motor to be disconnected from the shaft 26 in the event that it is desired or necessary that hand operation be accomplished. For such purpose, it is merely necessary to remove pin 54 to disconnect the motor and to remove handle 58 for mounting of the hand crank.

Operating controls 62, such as switch means in the event that the drive motor 30 is an electric motor, are suitably mounted for convenient manipulation, such as on one side of the landing gear frame 16, for controlling extension and retraction of the leg members 20.

It is to be understood that the form of my invention herein shown and described is to be taken as a preferred example of the same and that various changes in the shape, size and arrangement of parts may be resorted to without departing from the spirit of my invention, or the scope of the subjoined claims. For example, the motor housing 30 can as well be mounted on the outer side of frame member 18 and similarly attached to the shaft 26.

Having thus described my invention, I claim:

1. In combination
   (a) a trailer landing gear assembly having a cross frame,
   (b) a pair of upright housings secured to said cross frame,
   (c) telescoping leg members projecting from the lower end of said housing and having a drive connection with said housings for extending and retracting said leg members,
   (d) a driven shaft extending between said housings and having a rotative association with said drive connections whereby to extend or retract said leg members upon rotation thereof,
   (e) a gear reduction assembly on said driven shaft having an input shaft arranged to rotate said driven shaft through said gear reduction assembly and projecting from the latter,
   (f) said input shaft being shiftable axially to change the output ratio of said gear reduction assembly,
   (g) a drive motor having an output shaft,
   (h) mounting means mounting said drive motor on said frame with its output shaft aligned axially with the input shaft of said gear reduction assembly,
   (i) a coupling sleeve secured to said output shaft and having a releasable connection with one end of said input shaft for coupling said output shaft with said input shaft,
   (j) said sleeve connection maintaining a drive connection between said input shaft and said output shaft in all shifting movements of said input shaft.

2. The combination of claim 1 wherein said input shaft projects from both sides of said gear reduction assembly and the other end of said input shaft from the end which is coupled to said output shaft is arranged for receiving a hand crank for rotating said input shaft in lieu of said drive motor.

3. The combination of claim 2 wherein said coupling sleeve is releasably mounted on said input shaft for disconnection of driving power from said drive motor when it is desired to rotate said input shaft by means of a hand crank.

4. The combination of claim 1 wherein said drive motor is enclosed in a housing and said housing includes said mounting means for mounting said drive motor on said frame.

* * * * *